United States Patent [19]

Mitani et al.

[11] Patent Number: 4,982,289

[45] Date of Patent: Jan. 1, 1991

[54] LIQUID COOLED CATHODE RAY TUBE APPARATUS FOR VIDEO PROJECTION SYSTEM

[75] Inventors: Katsuaki Mitani, Ibaraki; Isao Matsuda, Hirakata, both of Japan

[73] Assignee: Matsushita Electric Industrial Co., Ltd., Kadoma, Japan

[21] Appl. No.: 351,990

[22] Filed: May 15, 1989

[51] Int. Cl.[5] .......................... H04N 5/65; H04N 7/74

[52] U.S. Cl. .................................... 358/237; 358/231; 358/245

[58] Field of Search ................. 358/237, 231, 245, 60, 358/64, 247, 254; 313/45

[56] References Cited

U.S. PATENT DOCUMENTS

| | | | |
|---|---|---|---|
| 4,405,949 | 9/1983 | Hockenbrock | 358/237 |
| 4,609,945 | 9/1986 | Oguino | 358/237 |
| 4,612,582 | 9/1986 | Tucker | 358/237 |
| 4,631,594 | 12/1986 | Imabayashi | 358/231 |
| 4,646,143 | 2/1987 | Watanabe | 358/60 |
| 4,651,217 | 3/1987 | Yamazaki | 358/231 |
| 4,717,853 | 1/1988 | Ezawa | 358/237 |
| 4,777,532 | 10/1988 | Hasegawa | 358/237 |

FOREIGN PATENT DOCUMENTS

| | | |
|---|---|---|
| 59-7728 | 3/1984 | Japan . |
| 62-35428 | 2/1987 | Japan . |

*Primary Examiner*—Tommy P. Chin

*Attorney, Agent, or Firm*—Cushman, Darby & Cushman

[57] ABSTRACT

In a video projector for projecting video images on phosphor screens of cathode ray tubes to a screen, a refrigerant mixture of ethylene glycol, diethylene glycol and glycerine is filled in watertight spaces enclosed by the cathode ray tubes, radiators and projection lenses.

3 Claims, 7 Drawing Sheets

LIQUID COOLED CATHODE RAY TUBE APPARATUS FOR VIDEO PROJECTION SYSTEM

FIELD OF THE INVENTION AND RELATED ART STATEMENT

1. Field of the Invention

The present invention relates to a video projector and especially relates to a cooling system of the video projector.

2. Description of the Related Art

A conventional cooling system of a video projector is described with referring to FIGS. 1, 2, 3, 4 and 5.

A typical video projecting apparatus having a cooling system is shown in FIGS. 1 and 2. FIG. 1 is an exploded view for showing the construction of a mono-color video projecting apparatus for projecting a video image of one of red, blue and green color images. FIG. 2 is a sectional assembling drawing of the mono-color video projecting apparatus.

As shown in FIGS. 1 and 2, the mono-color video projecting apparatus comprises a cathode ray tube 1 (hereinafter abbreviated as CRT), a spacer 2, a radiator 10 made of metal for radiating heat from the CRT 1 and a projection lens 11 for projecting video images on a front phosphor screen 1*a* of the CRT 1. The lens 11 is watertightly fixed to a front face 10*a* of the radiator 10 by silicone adhesive 8. Inner periphery 10*b* of the radiator 10 is watertightly bonded around outer periphery 1*b* of the CRT 1 by the silicone adhesive 8. The spacer 2 is sandwiched between the CRT 1 and the radiator 10 for positioning the radiator 10 at a desired position against the front phosphor screen 1*a* of the CRT 1. The CRT 1, the radiator 10 and the projection lens 11 make a watertight space 9. Refrigerant 12 is filled in the watertight space 9 from a tapped hole 15 which is formed on a side wall of the radiator 10. The tapped hole 15 is sealed by an O-ring 13 and a screw 14 screwed therein for sealing the refrigerant 12 in the watertight space 9 from the tapped hole 15.

When working potentials and a video signal are applied to the CRT 1, a video image is formed on the front phosphor screen 12 of the CRT 1. Heat is generated on the front phosphor screen 1*a* of the CRT 1 by impinging of electron beams thereto.

If the video projecting apparatus is not cooled, the temperature at the front phosphor screen 1*a* of the CRT 1 becomes about 120°-150° C. And heat of the front phosphor screen 1*a* of the CRT 1 transfers to the projection lens 11. As a result, temperature at the projection lens 11 is raised to about 100°-140° C.

The refrigerant 12, however, is filled in the watertight space 9 enclosed by the CRT 1, the radiator 10 and the projection lens 11. Most of the heat of the front phosphor screen 1*a* of the CRT 1 is absorbed by the refrigerant 12. Heated refrigerant 12 convects to the top part of the watertight space 3 and radiates heat from the upper radiating fins 10*c* of the radiator 10, and the refrigerant 12 is cooled. The cooled refrigerant 12 convects to bottom part of the watertight space 9, and accordingly, the total temperature of the refrigerant 12 is kept in a range of 70°-80° C. by convection.

As refrigerant 12, a mixed fluid of ethylene glycol and water, for example, shown in Japanese Published Unexamined Patent Application Sho 62-35428 is used. The mixing ratio of ethylene glycol and water is e.g. 100:20 in wt.

The above mentioned conventional video projecting apparatus and cooling system thereof, however, has the following disadvantages.

(1) The vapor pressure of ethylene glycol is relatively low but that of water is high as shown in FIG. 3. Therefore, when the temperature in the watertight space 9 is about 80° C., the vapor pressure of the mixed fluid of ethylene glycol and water refrigerant 12 becomes very high. By such a vapor pressure, the adhesive 8 which is used for bonding the CRT 1 and the radiator 10, and the radiator 10 and the projection lens 11 expands. Accordingly, the distance between the front phosphor screen 1*a* of the CRT 1 and the projection lens 11 changes significantly with temperature changes or temperature drift as shown in FIG. 4. And thereby, projection performance of the lens 11 such as focusing or resolution is detracted.

(2) If a plastic lens is used for the projection lens 11, water contained in the refrigerant 12 at about 20 wt % is partly absorbed in the plastic lens, and vapor of water permeates and evaporates through the projection lens 11. Therefore, amount of the refrigerant 12 gradually decreases as shown in FIG. 5. When the level of the refrigerant 12 goes below a predetermined level, rays from the CRT 1 are eclipsed, and the projection performance of the lens 11 such as focusing or resolution performance is also undesirably damaged.

OBJECT AND SUMMARY OF THE INVENTION

An object of the present invention is to provide an improved video projector for maintaining focusing and resolution performance without being affected by the temperature dependency or temperature drift.

A video projector in accordance with the present invention comprises:

a cathode ray tube for making video images on a phosphor screen thereof;

a projection lens disposed in front of the cathode ray tube for projecting the video images to a screen disposed at a predetermined position;

at least one radiator disposed between the cathode ray tube and the projection lens; and transparent refrigerant fluid which is a mixture of ethylene glycol, diethylene glycol and glycerine and watertightly filled in a space defined by the surface of the cathode ray tube, the projection lens and the radiator.

As mentioned above, the refrigerant does not contain water at all. Therefore, the vapor pressure of the refrigerant in the space enclosed by the cathode ray tube, the projection lens and the radiator is not so high even when the temperature of the refrigerant is about 80° C. as shown in FIG. 3. Furthermore, as the refrigerant does not contain water, the refrigerant is hardly absorbed by the material of the projection lens such as plastic, and loss of the refrigerant due to permeating of vapor is very few. As a result, the projection performance such as focusing and/or resolution is maintained regardless of temperature dependency or secular change.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF THE PREFERRED EMBODIMENTS

A preferred embodiment of a video projector in accordance with the present invention is described with reference to FIGS. 6 and 7.

Figure 6:
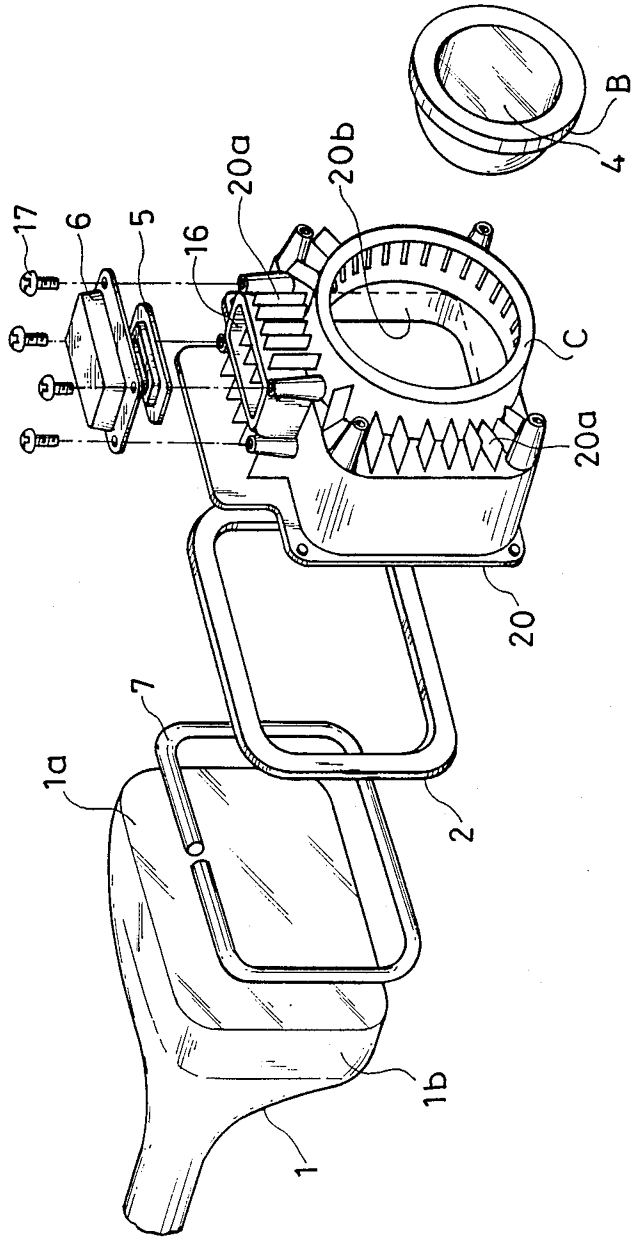
FIG. 6 is an exploded view of a preferred embodiment of a video projector in accordance with the present invention.

FIG. 6 is an exploded view of a video projector. FIG. 7 is a sectional assembled view of the video projector shown in FIG. 6. The video projector shown in FIGS. 6 and 7 is especially a mono-color video projector with a cooling system, for example, for projecting a video image of one of blue, green and red images. For a color video projector, three mono-color video projectors shown in FIGS. 6 and 7 respectively projecting a video image of blue, green and red are used. Hereinafter, one mono-color video projector is described.

Figure 7:
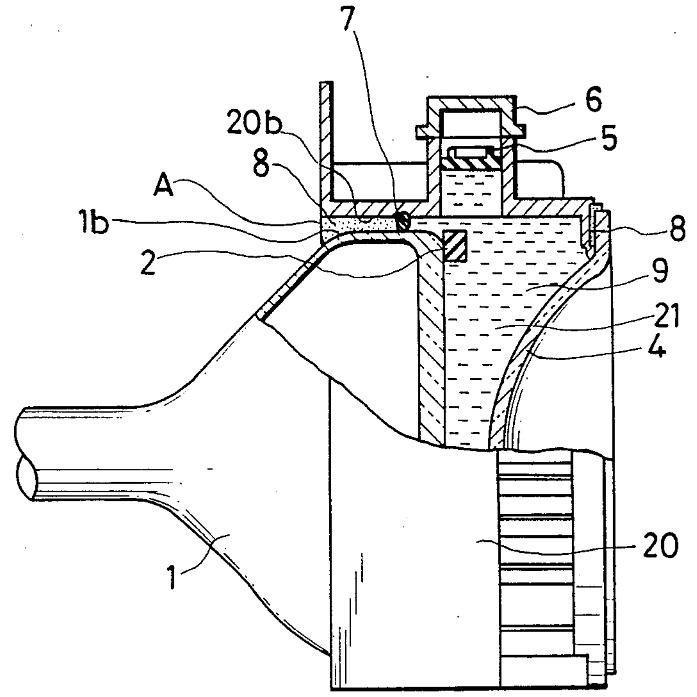
FIG. 7 is a sectional view of the assembled video projector shown in FIG. 6.

In FIGS. 6 and 7, the mono-color video projector comprises: a CRT 1 for forming video images on a front phosphor screen 1*a* which is a mono-color of one of red, green and blue; a radiator 20 made of metal and having radiating fins 20*a*, an injection cock 16 and a diaphragm 5 inserted therein; a spacer 2 disposed between the CRT 1 and the radiator 20 for maintaining the front face of the CRT 1 and the rear face of the radiator 20 in a predetermined distance; and a projection lens 4 disposed on the front face of the radiator 20. A rubber string 7 has a diameter of about 0.1–0.2 mm which has larger width than a gap A between outer periphery 1*b* of the CRT 1 and the inner periphery 20*b* of the radiator 20 as shown in FIG. 7. The rubber string 7 is stuffed in the gap A and is watertightly bonded by filling an adhesive 8 such as silicone in the gap A. At this time, centers of the CRT 1 and the radiator 20 are aligned. Rear face of outer periphery B of the projection lens 4 is watertightly bonded on front mounting face C of the radiator 20 by the adhesive. Thereby, a watertight space 9 is formed by the CRT 1, the radiator 20 and the projection lens 4.

After that, refrigerant 21 is filled in the watertight space 9 through the injection port 16 until level of the refrigerant 21 reaches a predetermined upper limit. When the refrigerant 21 is filled, the diaphragm 5 made of fluoro rubber is inserted through the injection port 16, and then the injection port 16 is covered by a filler cap 6 which is fixed on the radiator 20 by screws 17.

When video signals are applied to the CRT 1 under condition that the refrigerant 21 is filled, the front phosphor screen 12 on the CRT 1 is heated by impingement by electrons. Heat on the CRT 1 is conducted to the refrigerant 21 and the refrigerant 21 expands. For the expanded volume of the refrigerant 21, the diaphragm 5 expands. Thereby, any pressure caused by the expansion of the refrigerant 21 does not adversely act on the CRT 1 and the projection lens 4.

Furthermore, the refrigerant 21 convects in the watertight space 9 and heat of the refrigerant 21 is radiated and cooled by the radiating fins 20*a* of the radiator 20. Therefore, temperature of the refrigerant 20 is kept below a predetermined level and not raised above that level.

Still more, even when the projection lens 4 is heated and expanded by the temperature rise of the refrigerant 21, stress is not applied to the projection lens 4 because the adhesive 8 for bonding the radiator 20 and the projection lens 4 is an elastic body such as silicone. Accordingly, deformation or breakage of the projection lens 4 does not occur at all.

In the above-mentioned embodiment, a mixed fluid of ethylene glycol, diethylene glycol and glycerine is used as the refrigerant 21. A fluid having mixing ratios of 80–50 wt % of ethylene glycol, 40–10 wt % of diethylene glycol and 5–40 wt % of glycerine is preferable. Vapor pressure of the mixed fluid of ethylene glycol, diethylene glycol and glycerine is lower than that of the conventional mixed fluid of ethylene glycol and water in comparison with themselves, because the vapor pressure of diethylene glycol is lower than that of water at temperature about 80° C.

Figure 1:
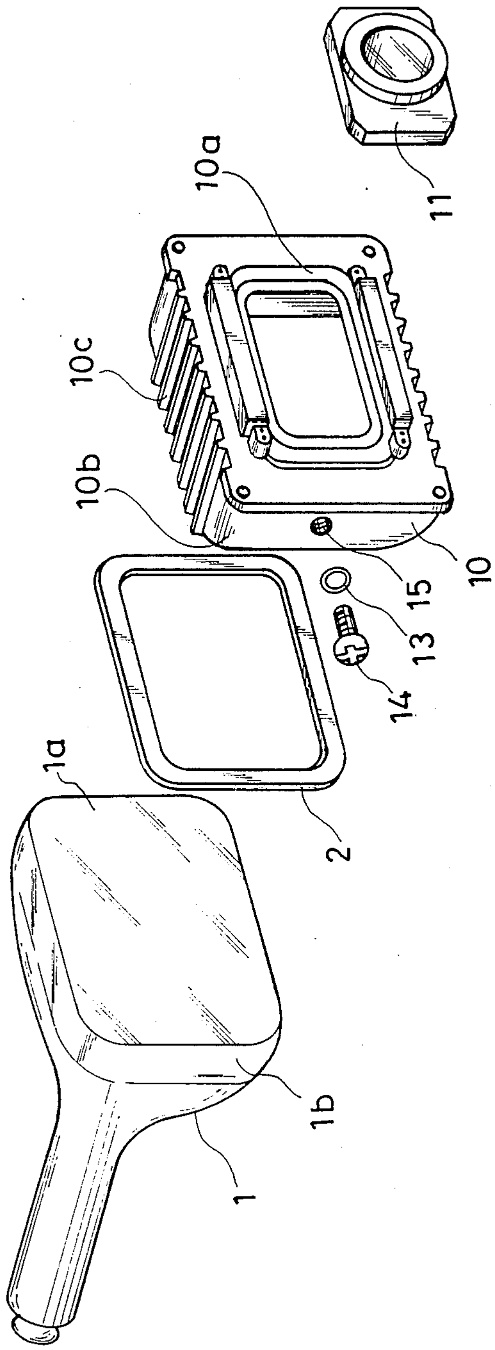
FIG.1 (Prior Art)
FIG. 1 is an exploded view of a typical video projector having cooling system.
Figure 2:
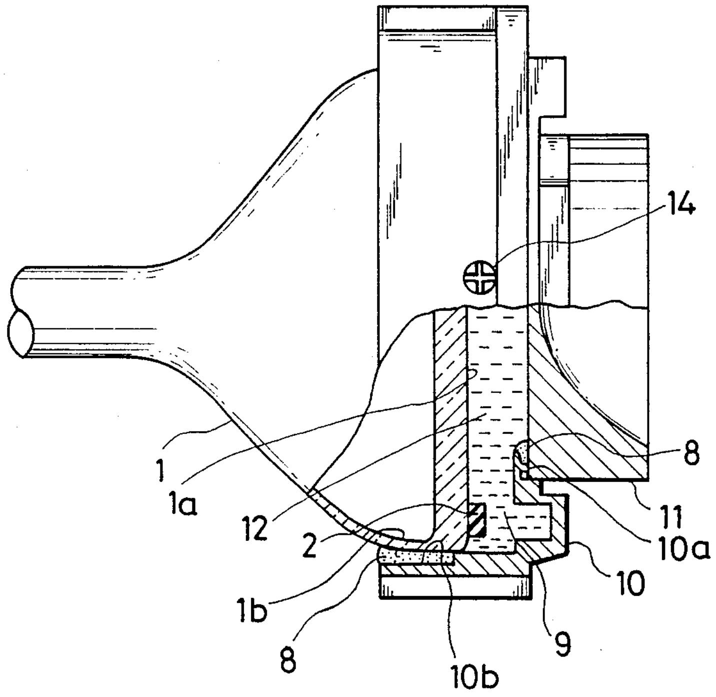
FIG. 2 (Prior Art)
FIG. 2 is a sectional assembling view of the video projection shown in FIG. 1.
Figure 3:
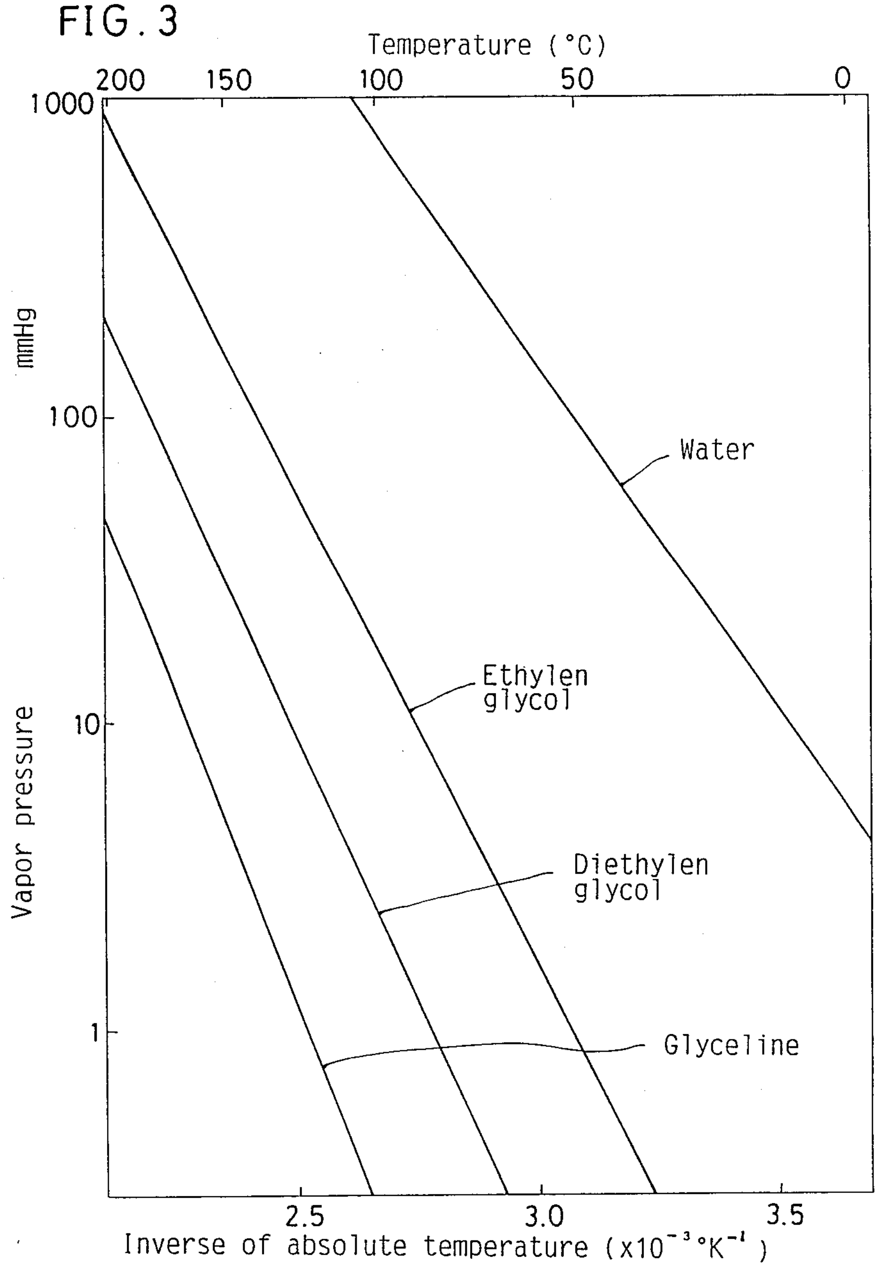
FIG. 3 is a drawing for showing characteristics of vapor pressure versus temperature of fluids used for refrigerant.
Figure 4:
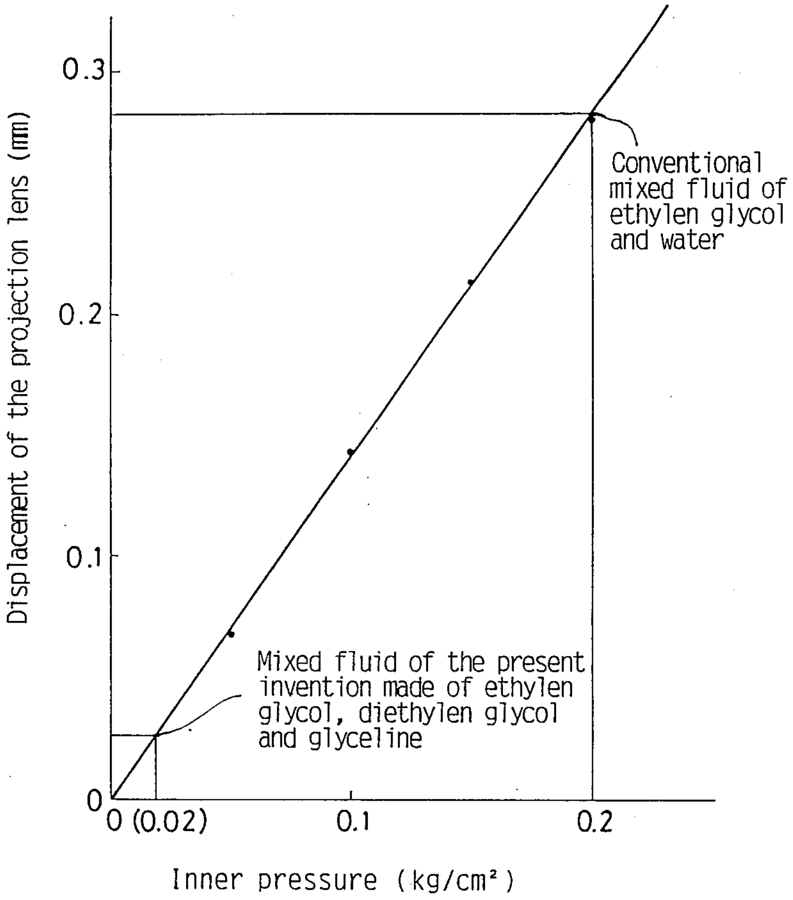
FIG. 4 is a drawing for showing characteristics of displacement between a projection lens and a cathode ray tube versus pressure of the refrigerant in the space enclosed by the cathode ray tube, the projection lens and the radiator.

Comparison between the mixed fluid consisting of ethylene glycol, diethylene glycol and glycerine of the above-mentioned embodiment and the conventional mixed fluid consisting of ethylene glycol and water, both under conditions that the refrigerant 21 is fully filled in the watertight space 9 and is heated at 80° C., is described below. In case of the conventional mixed fluid having mixing ratio of 80 wt % of ethylene glycol and 20 wt % of water, the vapor pressure of the mixed fluid is very high, about 450 mmHg at 80° C. At that time, inner pressure of the watertight space 9 which is filled with the mixed fluid was 0.2 Kg/cm$^2$. Such an inner pressure makes the adhesive 8 expand for bonding the CRT 1 and the radiator 10 (in FIG. 2) or 20 (in FIG. 7) and for bonding the radiator 10 (in FIG. 2) or 20 (in FIG. 7) and the projection lens 4. The distance between the CRT 1 and the projection lens 4 is largely changed as shown in FIG. 4, so that the projection performance such as focusing and resolution of the projection lens 4 is undesirably damaged in the prior art.

In contrast, in a mixed fluid having mixing ratio of 60 wt % of ethylene glycol, 30 wt % of diethylene glycol and 10 wt % of glycerine which is an embodiment of the refrigerant 21 in accordance with the present invention, the vapor pressure of the mixed fluid becomes relatively low as about 50 mmHg. Therefore, the inner pressure of the watertight space 9 which is filled with the mixed fluid of ethylene glycol, diethylene glycol and glycerine was only 0.02 Kg/cm$^2$. As a result of such low pressure, expansion of the adhesive 8 for bonding the CRT 1 and the radiator 10 or 20 and for bonding the radiator 10 or 20 and the projection lens 4 is very small. The distance between the front face of the CRT 1 and the projections lens 4 is changed very small wherein the displacement is about 0.03 mm as shown in FIG. 4. Accordingly, the projection performance of the projection lens 4 is hardly damaged by temperature dependency or temperature drift.

Figure 5:
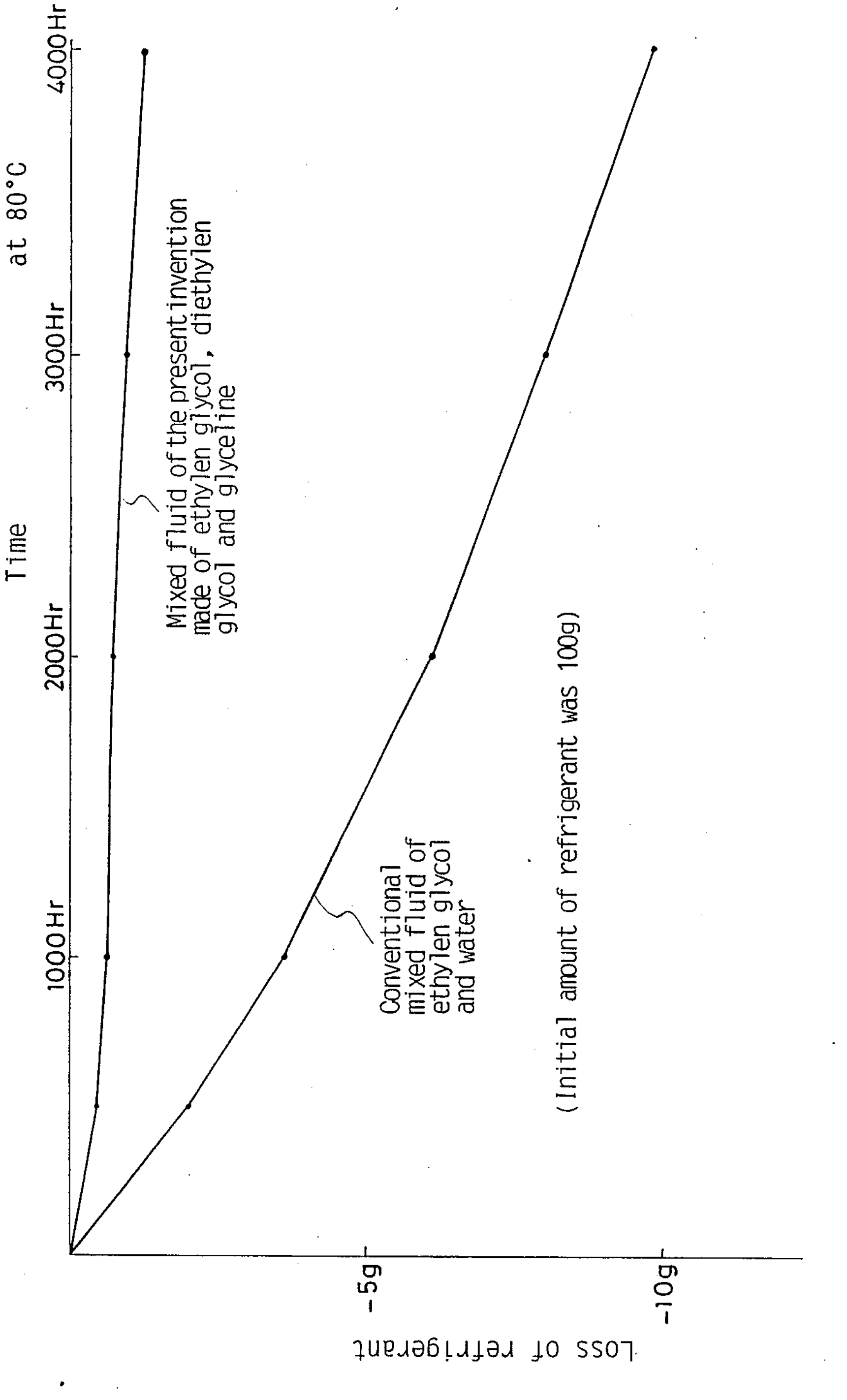
FIG. 5 is a drawing for showing characteristic curve of loss versus time of the refrigerant at 80° C.

Furthermore, loss of the refrigerant 21 in the watertight space 9 is measured at 80° C. because plastic for the projection lens 4 and silicone for the adhesive 8 have permeability and vapor of the refrigerant 21 permeates to the projection lens 4 and the adhesive 8. The amount conventional mixed fluid of ethylene glycol and water which is lost is as large as 9.8 per 100 g after passing 4000 Hr, as can be seen along the characteristic curve of loss versus time as shown in FIG. 5. On the contrary, loss of the mixed fluid consisting of ethylene glycol, diethylene glycol and glycerine in accordance with the present invention is as small as only about 1.2 g per 100 g after passing 4000 hr.

As mentioned above, the present invention uses the mixed fluid of 80–50 wt % of ethylene glycol, 10–40 wt % of diethylene glycol and 5–20 wt % of glycerine as refrigerant. The vapor pressure of the mixed fluid is relatively low and the loss due to the permeance through the plastic lens 4 or silicone adhesive 8 is small. Therefore, the mixed fluid directly contacts to the projection lens 4. As a result, the video projector can be made compact and inexpensive without adverse influence on optical characteristic by temperature dependency or temperature drift.

The mixed fluid of the present invention has further advantage in that a desired index of refraction thereof can easily be made by using the feature that the indexes of refraction of ethylene glycol (1.4316), diethylene glycol (1.4472) and glycerine (1.4746) are different from each other.

When the mixed fluid is, for example, made of only ethylene glycol and glycerine, the index of refraction thereof is in a range of 1.4395 to 1.4477. However, when the mixed fluid is made of ethylene glycol, diethylene glycol and glycerine in accordance with the present invention, the index of refraction thereof is in a range of 1.4361 to 1.4517 as shown in following table 1.

TABLE 1

| No. | Kind of mixed fluid | Mixing ratio | Index of refraction |
|---|---|---|---|
| 1 | ethylene glycol<br>glycerine | 80 wt %<br>20 wt % | 1.4395 |
| 2 | ethylene glycol<br>glycerine | 60 wt %<br>40 wt % | 1.4497 |
| 3 | ethylene glycol<br>diethylene glycol<br>glycerine | 80 wt %<br>10 wt %<br>10 wt % | 1.4361 |
| 4 | ethylene glycol<br>diethylene glycol<br>glycerine | 50 wt %<br>10 wt %<br>40 wt % | 1.4517 |

Therefore, performance of total optical system of the video projector can easily be changed widely and the most suitable liquid, e.g. a liquid having the desired characteristics can be obtained. As a result, improvement of contrast of the projection lens can be achieved by reduction of reflectance by the refrigerant.

Although the invention has been described in its preferred form with a certain degree of particularity, it is understood that the presemt disclosure of the preferred form has been changed in the details of construction and the combination and arrangement of parts may be resorted to without departing from the spirit and the scope of the invention as hereinafter claimed.

What is claimed is:

1. A liquid cooled cathode ray tube apparatus for a video projection system comprising:
   - a cathode ray tube for making a video image;
   - a plastic projection lens disposed in front of said cathode ray tube for projecting said video image to a predetermined position;
   - a radiator disposed between said cathode ray tube and said projection lens; and
   - a transparent refrigerant fluid consisting essentially of a mixture of ethylene glycol, diethylene glycol and glycerine and watertightly filled in a space defined by said cathode ray tube, said projection lens and said radiator.

2. A liquid cooled cathode ray tube apparatus for a video projection system according to claim 1, wherein said refrigerant fluild consists essentially of 80 to 50 wt % of ethylene glycol, 10 to 40 wt % of diethylene glycol and 5 to 40 wt % of glycerine.

3. A liquid cooled cathode ray tube apparatus for a video projection system according to claim 1, wherein said refrigerant fluid has an index of refraction similar to that of said plastic projection lens.

* * * * *